United States Patent [19]

Inose et al.

[11] 3,760,357

[45] Sept. 18, 1973

[54] TWO-DIMENSIONAL PATTERN NORMALIZER

[75] Inventors: Fumiyuki Inose; Yuzo Kita, both of Kokubunji, Japan

[73] Assignee: Hitachi, Ltd

[22] Filed: June 30, 1972

[21] Appl. No.: 268,113

[30] Foreign Application Priority Data

June 30, 1971 Japan .............................. 46/47212

[52] U.S. Cl. ....................................... 340/146.3 H, 340/146.3 MA, 340/147 HA, 340/147 YC, 340/147 TF

[51] Int. Cl. ............................................ G06k 9/04

[58] Field of Search ................ 340/174 TF, 174 M, 340/166 R, 146.3 H, 146.3 MA

[56] References Cited

UNITED STATES PATENTS

| | | | |
|---|---|---|---|
| 3,530,446 | 9/1970 | Perneski | 340/174 |
| 3,540,019 | 11/1970 | Bobeck et al. | 340/174 |

OTHER PUBLICATIONS

"Angelfish Logical Connectives for Bubble Domains," Almasi et al., IBM Tech. Dis. Bull. Vol. 13, No. 10, March 1971, pages 2992–2993.

"Bubble Domain Logical Devices," Lin, IBM Tech. Dis. Bull. Vol. 13, No. 10, March 1971, pages 3068–3068a.

"Two-Dimensional Shift Register For Cylindrical Magnetic Domains," Chang, IBM Tech. Dis. Bull. Vol. 13, No. 11, April 1971, pages 3290–3291.

"Shift Register for Cylindrical Magnetic Domains," Keefe et al., IBM Tech. Dis. Bull. Vol. 13, No. 11, April 1971, page 3309.

*Primary Examiner*—Thomas A. Robinson
*Attorney*—Paul M. Craig et al.

[57] ABSTRACT

A two-dimensional pattern normalizer includes a first and a second shift register array disposed on a substrate of magnetic material, such as orthoferrite, said first array being disposed at a desired angle with respect to said second array; wherein an input pattern provided as a parallel bit train is written in said first shift register array and said pattern is read out through said second shift register array, and thus an output pattern rotated at the desired angle with respect to the input pattern is produced.

16 Claims, 17 Drawing Figures

TWO-DIMENSIONAL PATTERN NORMALIZER

BACKGROUND OF THE INVENTION

1. Field of the Invention

The present invention relates to two-dimensional pattern normalizers used for the recognition of patterns, such as characters and pictures, and more particularly to a pattern rotating device capable of producing a pattern rotated at a predetermined angle with respect to the input pattern.

2. Description of the Prior Art

The pattern recognition system in general is dependent on a standard pattern with which the input pattern is compared because the state of the input pattern or the state of the input unit tends to be variable, with the result that the input pattern becomes inconstant even though such input pattern is supplied from one constant pattern source. The input pattern generally includes a component such as tilt, rotation, expansion, contraction, etc. This necessitates "preprocessing" whereby the input pattern is normalized before it is compared with the standard pattern. This process is referred to as "normalizing."

One prior art input pattern normalizing system utilizes an analog circuit, while another employs software techniques combined with a standard digital computer; however, the former is lacking in accuracy and complicated in circuit design and the latter is not efficient enough because it is inherently slow in calculation. In short, presently available systems are still far from ideal.

SUMMARY OF THE INVENTION

A principal object of the present invention is to provide an apparatus which is simple in construction, yet capable of high speed processing in normalizing the input pattern and producing an output pattern rotated to a desired angle with respect to the input pattern.

Another object of the invention is to provide a pattern rotating device comprising a first and a second shift register array wherein an input pattern is written in terms of parallel bits in sequence into said first shift register array, the written pattern is then shifted by said second shift register array in the direction different from the pattern input direction, and thus an output pattern rotated to a desired angle to the input pattern is produced.

With these and other objects in view, the present invention provides a two-dimensional pattern normalizer comprising shift register arrays capable of storing information at high density and shifting the input pattern. These useful functions depend largely on a semiconductor integrated circuit or magnetic domain device. Especially the use of a magnetic domain device helps simplify the circuit configuration and makes optical patterns readable.

The other objects, features and advantages of the invention will be apparent from the following detailed description when read in conjunction with the accompanying drawings.

DESCRIPTION OF THE PREFERRED EMBODIMENTS

Figure 1:
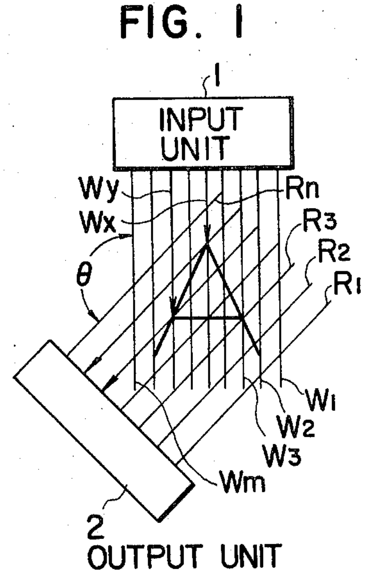
FIG. 1 is a schematic diagram illustrating the principles of the present invention.

Referring to FIG. 1, there is shown by example the principles of the present invention wherein a device 1 is provided for writing the input pattern into a shift register array, and a device 2 is provided for reading the written pattern. The symbols $W_1, W_2, \ldots W_m$ indicate individual shift register lines. Patterns are fed and written into m-number of the shift registers one after another. The symbols $R_1, R_2, \ldots R_n$ are also shift register lines. The written patterns are read out through the detector 2.

Figure 2A:
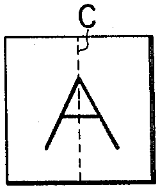
FIGS. 2A and 2B are schematic diagrams showing the principle of pattern rotation.
Figure 2B:
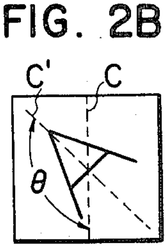

It is assumed that there is an angle $\theta$ between the write shift direction and the read shift direction. Then, it is apparent that the read pattern comes to form an angle $\theta$ with the written pattern. FIGS. 2A and 2B show the relationship between these patterns wherein FIG. 2 A is the written pattern, and FIG. 2 B is the read pattern. The center line c in FIG. 2A comes to $c'$ in FIG. 2B.

Figure 3:
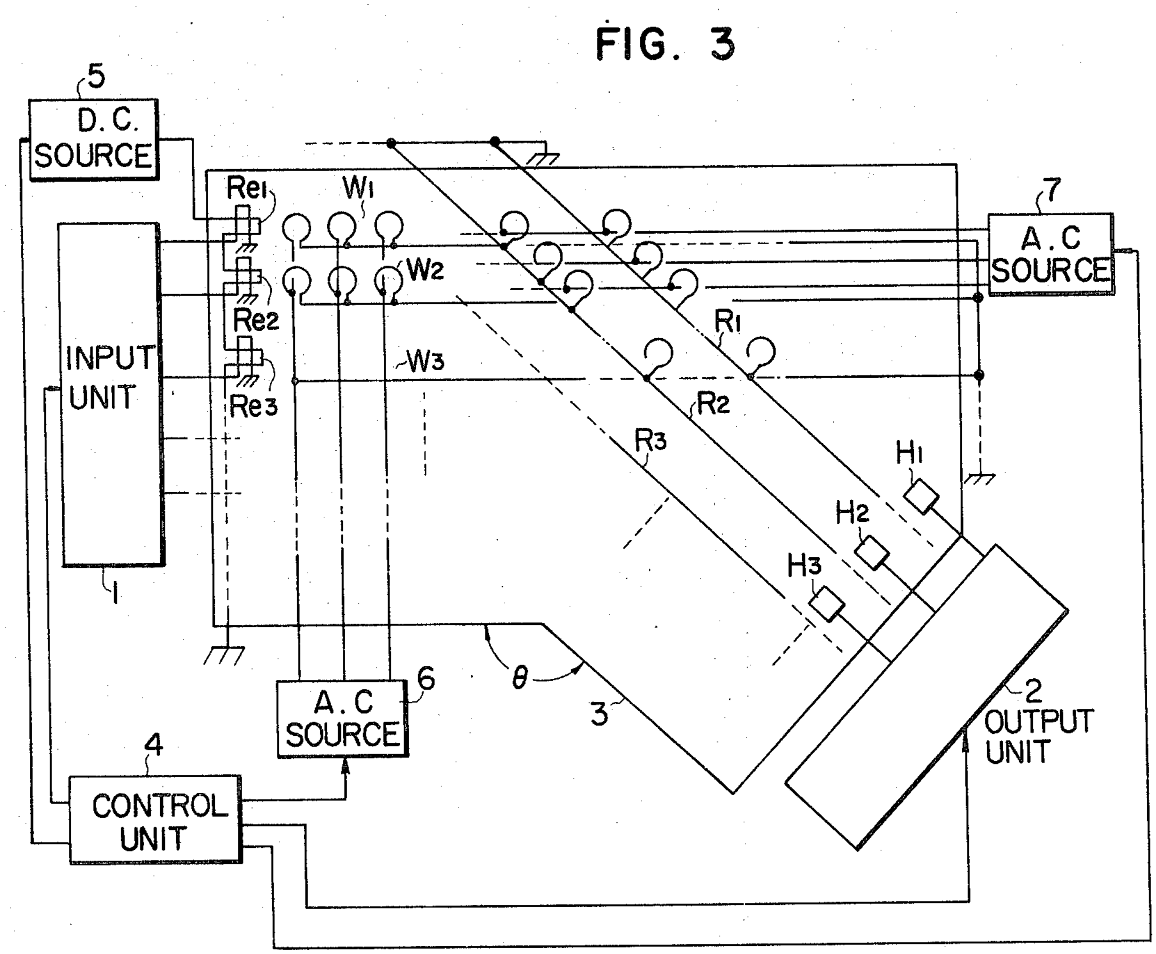
FIG. 3 is a schematic diagram showing one embodiment of the invention.

One embodiment of the invention is specifically illustrated in FIG. 3 including a substrate 3 comprising a magnetic material such as orthoferrite which can form a single wall domain. The term "single wall domain" is referred to as the magnetic region having the property of magnetization which has been reversed from the magnetic material of surrounding regions comprising the domain. The description on the properties of the single wall domain and some device applications is found in Bell System Technical Journal, Vol. 46, No. 8, October 1967.

Figure 4:
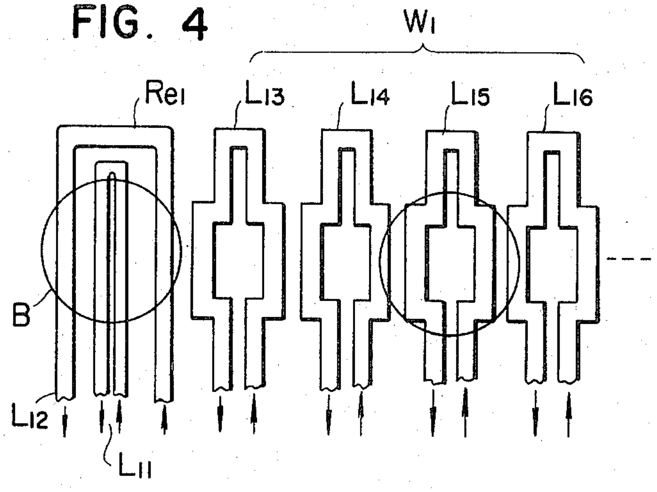
FIG. 4 is a schematic diagram showing an example of the conductor used for the purpose of the invention.

A number of conductor loops constituting shift registers $W_1, W_2, \ldots W_m$ are formed in parallel on the substrate 3. In the left part of the substrate 3 are replicators $Re_1, Re_2, \ldots Re_m$ through which magnetic domains are introduced into the shift registers $W_1, W_2, \ldots W_m$. FIG. 4 shows a specific example of an arrangement of replicator $Re_1$ and shift register $W_1$. This replicator consists of two conductor loops $L_{11}$ and $L_{12}$. Loop $L_{11}$ is given a binary-coded pulse input corresponding to the input pattern, and loop $L_{12}$ is supplied with a constant d-c current. The magnetic domain, indicated by B, is divided in two by the magnetic field formed by the pulse applied to the conductor loop $L_{11}$. One part of the domain remains in the position B, and the other part is sent out to the first conductor loop $L_{13}$ of the shift register $W_1$. As generally known, the magnetic domain in the place of conductor loop $L_{13}$ serves to supply the individual conductor loops $L_{13}$, $L_{14}$, $L_{15}$, . . . $L_{1n}$ with a-c currents having different phases and form mobile magnetic fields, and thus the magnetic domain shifts toward the right in the figure.

Various replicators are known in the art. For example, a replicator may comprise two perpendicularly crossing conductor loops, or the combination of a magnetic pattern and a conductor loop. According to the invention, the replicator $Re_1$ may be of any type so long as it is capable of supplying the magnetic domain to the shift register according to the input pulse.

A number of replicators $Re_1$ and conductor loops (i.e., shift register $W_1$) are formed in rows. Although FIG. 4 shows a small number of loops in a row for explanatory simplicity, a practical arrangement usually comprises rows of loops having as many as 100 to 1000 loops. The interval between the adjacent conductor loops must normally be more than four times the diameter of the magnetic domain.

The conductor loop constituting the write shift registers $W_1$, $W_2$ . . . $W_m$ and the conductor loop constituting the read shift registers $R_1$, $R_2$, . . . $R_m$ are formed and separated by way of an insulating layer (not shown) on the same substrate 3. There is an angular deviation $\theta$ in the magnetic domain shifting direction between the write and read shift register arrays. Hall elements $H_1$, $H_2$, . . . $H_m$ isolated from the conductor loops constituting the shift registers are formed on the substrate 3 in the area corresponding to the ends of the shift registers $R_1$, $R_2$, . . . $R_m$. These Hall elements are for detecting the presence of a magnetic domain. Instead, other known suitable detecting means may be used. For example, the magnetic domain can be detected optically if the properties of magnetic domain are utilized.

The pattern input unit 1 is one which codes an analog picture information into a binary form and transforms it into a parallel bit train. This input unit has its output terminal connected to the conductor loops $L_{11}$, $Lv_{12}$, . . . $L_{2m}$ of the replicators $Re_1$, $Re_2$, . . . $Re_m$. A d-c source 5 supplies a d-c current to the conductor loops of the replicators $Re_1$, $Re_2$, . . . $Re_m$, and a-c or pulse sources 6 and 7 are provided for forming a magnetic field whereby the magnetic domain supplied to the array of shift registers $W_1$, $W_2$, . . . $W_m$ and to the array of shift registers $R_1$, $R_2$, . . . $R_m$ is shifted in a specific direction. These a-c sources 6 and 7 are connected to the conductor loops of the respective shift registers. In FIG. 3 the a-c sources 6 and 7 are separated. Instead, these a-c sources may be combined into one. The numeral 2 denotes an output unit which is given a rotated pattern. The parallel bit train signal from the Hall elements $H_1$, $H_2$, . . . $H_m$ is applied to the input terminal of the output unit 2. The operations of the units 1, 2, 5, 6 and 7 are controlled by a control unit 4.

This two-dimensional pattern normalizing apparatus is operated in the following manner. First, a pulse corresponding to the picture pattern is applied to each of the replicators $Re_1$, $Re_2$, . . . $Re_m$ from the input unit 1 under the condition that no current is supplied to the conductor loops of the read shift registers R1, $R_2$, . . . $R_m$. At the same time a current is supplied to the conductor loop of the write shift registers $W_1$, $W_2$, . . . $W_m$ from the a-c source 6. As a result of this operation, the magnetic domain corresponding to the input pattern shifts right. When the pattern expressed by the magnetic domain enters the region where the array of shift registers $W_1$, $W_2$, . . . $W_m$ crosses the array of shift registers $R_1$, $R_2$, . . . $R_m$, the control unit 4 generates a control signal whereby the current supply from the a-c source 6 to the array of shift registers $W_1$, $W_2$, . . . $W_m$ is stopped, and the a-c source 7 starts supplying current to the array of shift registers $R_1$, $R_2$, . . . $R_m$. At this moment, the magnetic domain seized in the conductor loop of the write shift registers shifts to the conductor loop of the read shift registers positioned nearest the conductor loop of the write shift registers. This movement of magnetic domain is spontaneous owing to the properties of the magnetic domain. Instead, the magnetic domain can be shifted compulsorily by the use of a modified conductor loop arrangement shown in FIG. 5.

Figure 5:
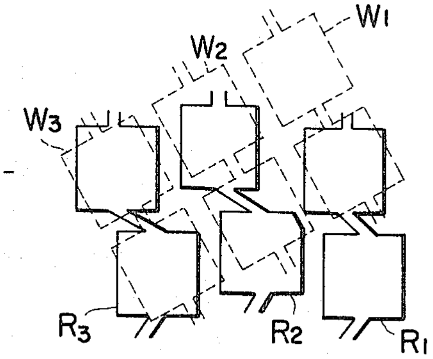
FIG. 5 is a schematic diagram showing an example of the conductor loop in the shift register cross region.

In FIG. 5, the conductor loop of the write shift registers $W_1$, $W_2$, . . . $W_m$ is partly superposed on the conductor loop of the read shift registers $R_1$, $R_2$, . . . $R_m$ by way of an insulating layer. Hence, the place to which the magnetic domain shifts is uniquely determined without involving uncertainty. Thus, the pattern of this magnetic domain is shifted to the read registers $R_1$, $R_2$, . . . $R_m$, toward the right lower direction, and then detected by the array of Hall elements $H_1$, $H_2$, . . . $H_m$ and is binary-coded into a digital signal, which is then given to the output unit 2. It is apparent that the output pattern produced thereby in the output unit 2 has been rotated to an angle at which the array of shift registers $W_1$, $W_2$, . . . $W_m$ crosses the array of shift registers $R_1$, $R_2$, . . . $R_m$.

Figure 6A:
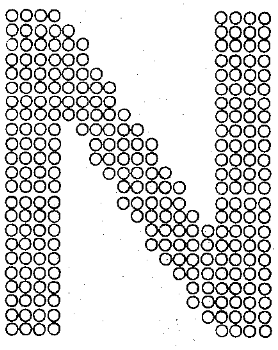
FIGS. 6A and 6B are schematic diagrams showing patterns rotated according to the invention.
Figure 6B:
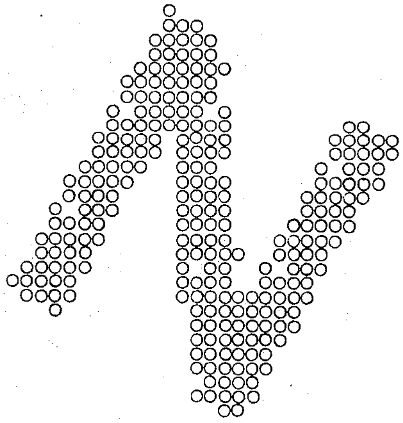

FIGS. 6A and 6B illustrate the rotation of a pattern; FIG. 6B represents the 30° rotation of FIG. 6A.

In the above process, when the magnetic domain is not switched from the write shift register array ($W_1$, $W_2$, . . . $W_m$) to the read shift register array ($R_1$, $R_2$, . . . $R_m$), the magnetic domain can be shifted along the shift registers $W_1$, $W_2$, . . . $W_m$ and thus an unrotated pattern can be obtained. In other words, the apparatus shown in FIG. 3 is capable of providing both rotated and unrotated patterns. Also, the pattern of the magnetic domain obtained in the read shift registers $R_1$, $R_2$, . . . $R_m$ can be shifted in the vertical direction by controlling the timing at which the magnetic domain is switched from the write shift register array to the read shift register array.

In the above embodiment, the magnetic domain shifts in the read shift registers $R_1$, $R_2$, . . . $R_m$ in one direction. Hence, it is apparent that the magnetic domain may be shifted in both directions when the phase of the current supplied to the conductor loops is suitably controlled. In other words, the pattern of the magnetic domain can be rotated in either positive or negative direction, according to the invention. The rotating angle of the pattern can be arbitrarily determined when the read conductor loop is formed in a multi-layer construction by way of interposed insulating layers.

Figure 7:
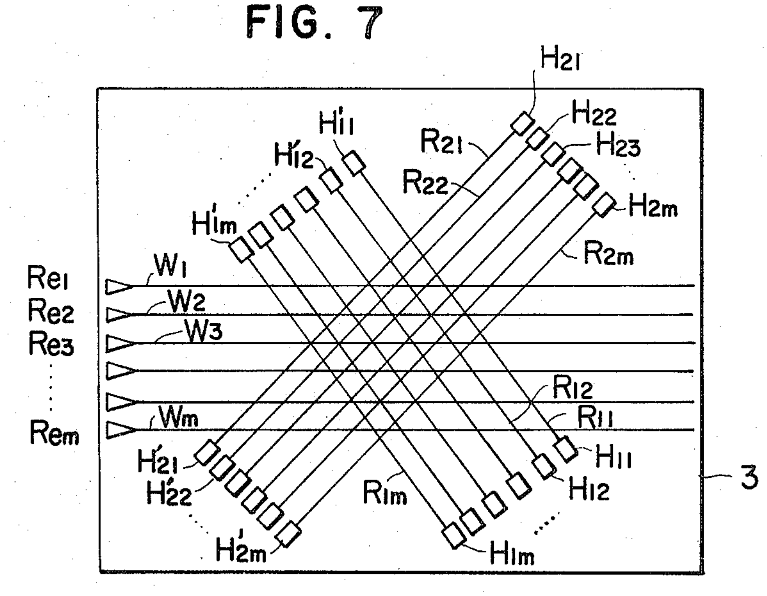
FIG. 7 is a schematic diagram showing an arrangement of the shift register array of this invention.

FIG. 7 illustrates by example another embodiment of the invention with the above concept in view. Read shift registers $R_{11}$, $R_{12}$, . . . $R_{1m}$ and $R_{21}$, $R_{22}$, . . . $R_{2m}$ are formed in multi-layer construction by way of insulating layers (not shown). Hall elements $H_{11}, H_{12}, \ldots H_{1m}$ and $H'_{11}, H'_{12}, \ldots H'_{1m}$ and $H_{21}, H_{22}, \ldots H_{2m}$ and $H'_{21}, H'_{22} \ldots H'_{2m}$ are disposed in the locations corresponding to the ends of the respective shift registers. In this arrangement, the direction in which the magnetic domain is shifted can be arbitrarily determined by the shift register array to which a current is supplied and by the phase of this current.

Figure 8:
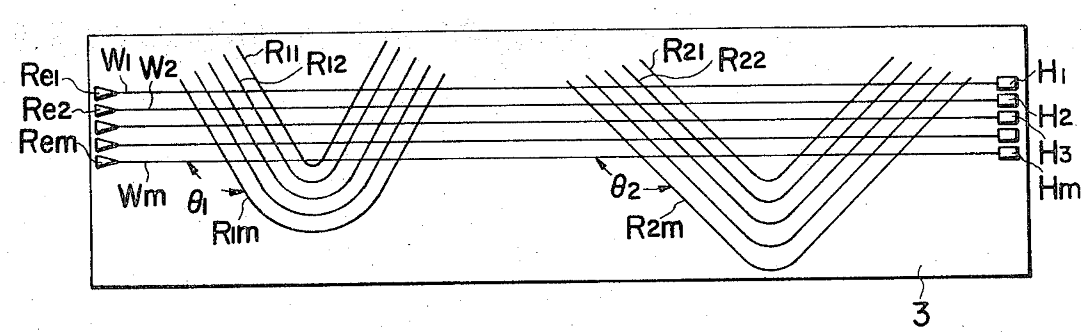
FIG. 8 is a schematic diagram showing another arrangement of the shift register array of this invention.

FIG. 8 shows by example another embodiment of the invention. On the substrate 3, an array of write shift registers $W_1, W_2, \ldots W_m$ are formed in a specific direction, and also a first array of read shift registers $R_{11}, R_{12}, \ldots R_{1m}$ are formed. These write and read shift register arrays cross each other at an angle $\theta_1$. The first read shift register array is curved on the same substrate, and crosses again the write shift register array. Further, a second array of read shift registers $R_{21}, R_{22}, \ldots R_{2m}$ cross at an angle $\theta_2$ the write shift register array in the area other than where the first read shift register array crosses. This second shift register array also is curved on the same substrate and again crosses the write shift register array. In FIG. 8, two read shift register arrays are shown. Instead, more read shift register arrays may be disposed to cross the write shift register array at different angles, respectively.

In the arrangement as in FIG. 8, when the pattern of the magnetic domain comes to the region where the write shift register array crosses the first and second read shift register arrays, the path along which the pattern shifts is determined according to which shift register array is driven. Hence, by changing the combination of various shift paths, the output pattern rotating angle can be arbitrarily changed. In the example of FIG. 8, the rotating angle of the output pattern to the input pattern can be determined to be $\theta_1$, $\theta_2$ or $\theta_1 + \theta_2$.

Figure 9:
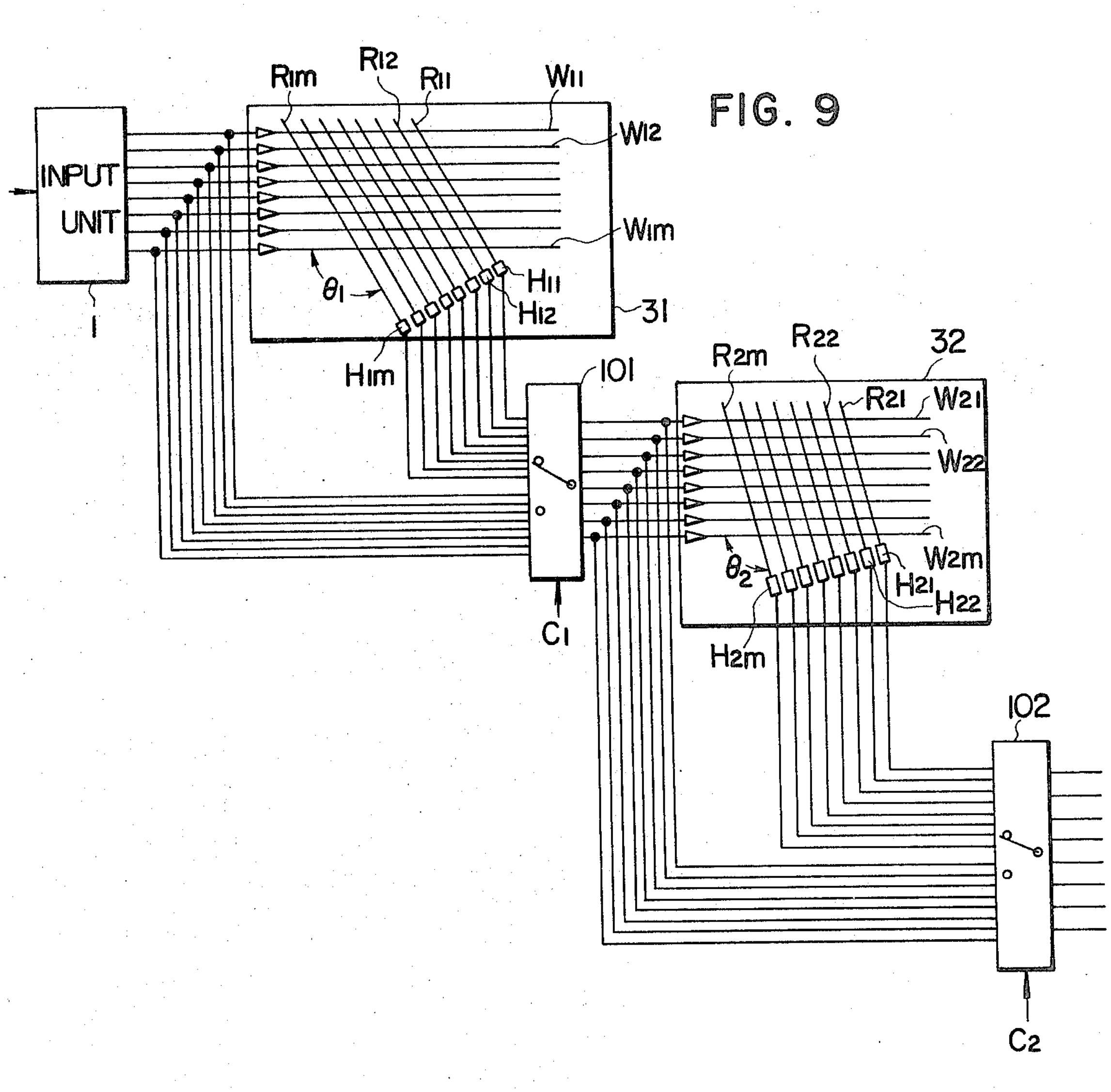
FIG. 9 is a schematic diagram showing another embodiment of the invention.

FIG. 9 schematically illustrates another embodiment of the invention wherein a bit train corresponding to an image pattern from the input unit 1 is applied to an array of write shift registers $W_{11}, W_{12}, \ldots W_{1m}$ formed on a substrate 31. This bit train is also applied directly to a switching device 101. The pattern in the write shift register array is transferred to an array of read shift registers $R_{11}, R_{12}, \ldots R_{1m}$ and detected by an array of Hall elements $H_{11}, H_{12} \ldots H_{1m}$, and then is applied to the switching device 101. This switching device is controlled by a control signal $c_1$ so as to allow the switching device to deliver one of the two input signals selectively.

The output of the switching device 101 is applied to an array of write shift registers $W_{21}, W_{22}, \ldots W_{2m}$ formed on another substrate 32. This output is also directly applied to a switching device 102. The pattern in the shift register array on the substrate 32 is transferred to an array of read shift registers $R_{21}, R_{22}, \ldots R_{2m}$ and detected by an array of Hall elements $H_{21}, H_{22}, \ldots H_{2m}$ and then is applied to the switching device 102. As in the switching device 101, the switching device 102 is controlled by a control signal $c_2$ so that one of the signals is selected to be applied to the output side.

Thus, by forming multiple stages of the foregoing arrangement, it becomes possible to obtain a variety of combinations of paths along which the pattern from the input unit is applied to the output side. Therefore, the rotating angle of the pattern appearing on the output side can be arbitrarily determined. Compared with the system of FIG. 8, this system is advantageous from the manufacturing point of view since the crystal area necessary per substrate is small and the wiring in the shift register array is simple.

Figure 10:
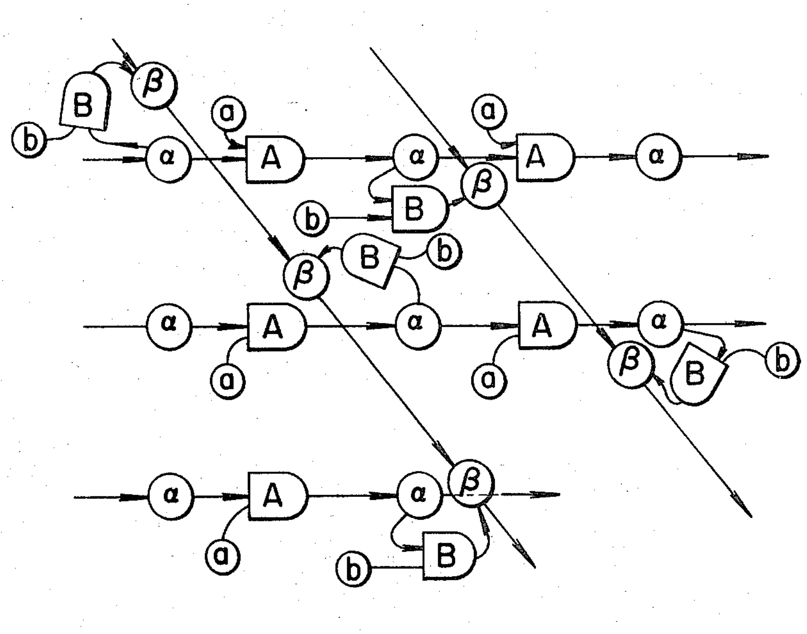
FIG. 10 is a diagram illustrating the principle of the invention realized by the use of bistable circuit configuration.

The foregoing embodiments use magnetic domain elements. The invention can also be realized by the use of semiconductor circuit techniques, as illustrated in FIG. 10. The symbols $\alpha$ and $\beta$ denote semiconductor shift registers forming flip-flops in multiple form, A and B AND gates, and a and b gate drive signals.

When an input pattern is fed to the system of shift register $\alpha$, with the gate A open and the gate B closed on condition that a is "1" and b is "0," and a shift pulse is applied thereto, the pattern will shift right. Then, when a shift pulse is applied to the system of shift register $\beta$, on condition that *a* is "o" and *B* "1," at the time the pattern enters the intersection of the $\alpha$ and $\beta$ systems, then the pattern is rotated and shifted to the $\beta$ system. In this manner the principle of this invention can readily be applied to a semiconductor circuit.

Figure 11:
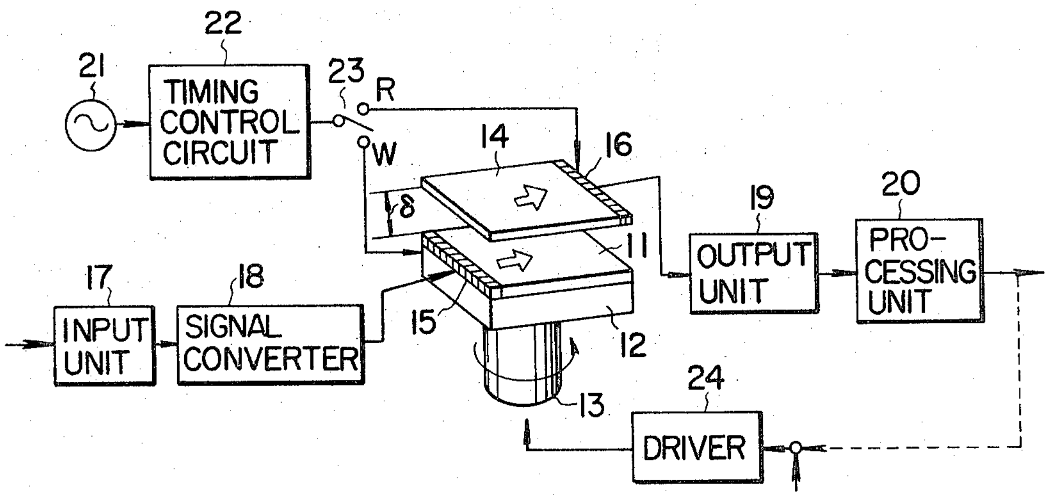
FIG. 11 is a schematic diagram showing another embodiment of the invention.

FIG. 11 schematically illustrates another embodiment of the invention wherein the shift register array is constituted of magnetic domain elements. In FIG. 11, the numeral 11 denotes a magnetic domain device supported by a supporting member 12 and rotated on a shaft 13 equipped to the supporting member 12. The magnetic domain device 11 comprises a magnetic material, such as orthoferrite having anisotropic properties. On the surface of the device 11 a conductor loop comprising a conductor film, on which patterns are written, is formed. An insulating plate 14 is disposed very closely adjacent to the top surface of the magnetic domain device 11. Another conductor loop comprising a conductor film, from which patterns are read, is formed on the bottom surface of the insulating plate 14 opposite to the top surface of the magnetic domain device 11, as in the conductor loop formed on the magnetic domain device 11.

In this arrangement, the magnetic domain formed on the magnetic domain device 11 can shift by way of the conductor loop on the device 11 or the conductor loop on the bottom of the insulating plate 14. The numeral 15 denotes a device called a replicator by which a domain pattern corresponding to the input pattern is written on the device 11. The numeral 16 is a magnetic domain pattern detector comprising, for example, a group of Hall elements disposed at one end of the insulating plate 14. An input pattern is supplied to a write device via a pattern input unit 17 and a signal converter 18, and an output pattern from the detector 16 is given to a processing unit 20 by way of an output unit 19. The numeral 21 denotes a power source capable of supplying an a-c current, such as a two-phase current, to the conductor loop on the device 11 or to the conductor loop on the insulating plate 14 by way of a timing control circuit 22 and a switch 23. The numeral 24 denotes a drive unit for rotating the shaft 13.

The original input pattern is optically received by the input unit 17 where it is converted into an electrical signal. This signal is then converted into a time-serial signal of binary parallel form by the signal converter 18. This binary signal controls the replicator 15. It is assumed that the contact W of the switch 23 is on, and an a-c current having two different phases is supplied to the conductor loop on the device 11. Then the input pattern of binary parallel form is written in sequence into the device 11 as a magnetic domain pattern through the replicator 15 and shifted in the arrow-marked direction. When the wiring of the input pattern into the device 11 is completed, the timing control unit 22 stops the current supply from the a-c source 21 to the conductor loop on the device 11. The driver 24 is actuated to rotate the shaft 13 and thus to rotate the device 11 (i.e., the domain pattern on the device 11) to an angle corresponding to the rotation of the shaft 13. When the device 11 is rotated to a desired angle, the contact R of the switch 23 is turned on, and an a-c current is supplied to the conductor loop of the insulator 14 from the a-c source 21. By this operation, the domain pattern on the device 11 is shifted in the direction determined by the conductor loop on the insulator 14, and then is read by the detector 16.

Thus, the output from the detector 16 is given a rotation to an angle corresponding to the rotating angle of the shaft 13, with respect to the original input pattern which has been written in the magnetic domain device 11. This output pattern undergoes necessary processes, such as normalization (other than rotation), and then is supplied to the processing unit 20 wherein it is compared with the standard pattern. The result of this comparison is fed back to the driver 24, if necessary.

Figure 12:
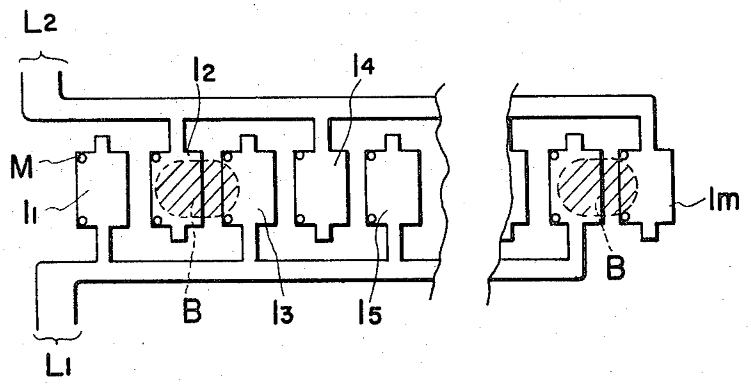
FIG. 12 is a schematic diagram showing a conductor loop used for the device as in FIG. 11.

FIG. 12 illustrates the principle of a system in which a pattern is shifted by the magnetic domain device 11 of FIG. 11. Referring to FIG. 12, a sectional view of the magnetic domain device is shown wherein conductor loop patterns $l_1$, $l_2$, . . . $l_m$ of the conductor film are formed on the surface of the domain device. These conductor loop patterns are connected serially one after every other one; one serial group leads to a conductor $L_1$ and the other to another conductor $L_2$. The symbol B denotes a magnetic domain formed on the magnetic domain device, and M identifies a magnetic body useful to hold the domain still. This domain shift system forms a conductor loop system in which, when an a-c current having different phases passes through the conductors $L_1$ and $L_2$, the magnetic domain shifts right or left in sequence along the loops $l_1$, $l_2$, . . . $l_m$. Hence, when similar conductor loops are disposed very closely adjacent to the magnetic domain device, and an a-c current having different phases is supplied to these conductor loops, the magnetic domain B formed on the domain device will shift in sequence along the conductor loops closely near the domain device, as in the conductor loops on the domain device.

An example of one application of this principle is shown in FIG. 11 wherein the magnetic domain pattern shifts along the conductor loops on the domain device 11 and on the insulator 14. In practice, however, this system involves the following problem if the pattern on the domain device 11 is read by the shift mechanism on the insulator 14 in the direction other than the write direction. Referring to FIG. 12, a conductor film pattern for shifting the magnetic domain is formed on the top of the domain device 11 and also on the bottom of the insulator 14. If the magnetic domain formed on the domain device 11 in the location, for example, of the $l_2$ of FIG. 12 is not captured by the corresponding loop on the insulator 14 at the time the domain device 11 has a specific angle with respect to the insulator 14, this may develop the possibility that the magnetic domain will remain unshifted or shift in an irregular direction when a shift signal (an a-c current signal) is supplied to the loop on the insulator 14. This difficulty can be overcome in the following manner. The angle between the device 11 and the insulator 14 is set at a specific value on the occasion the shift control is switched from the write to read operation. Then the shift current supply to the write side is stopped and at the same time the shift current is supplied to the read side. In this state no shifting is started, the magnetic domain is held immovable by the conductor loop on the bottom of the insulator 14. Then, a current is supplied to this conductor loop and, as this is done, the magnetic domain device is rotated. As a result of this operation, the magnetic domain is securely held by the conductor loop on the insulator 14, and will be shifted in the regular direction when the shift drive is effected on the read side.

Figure 13:
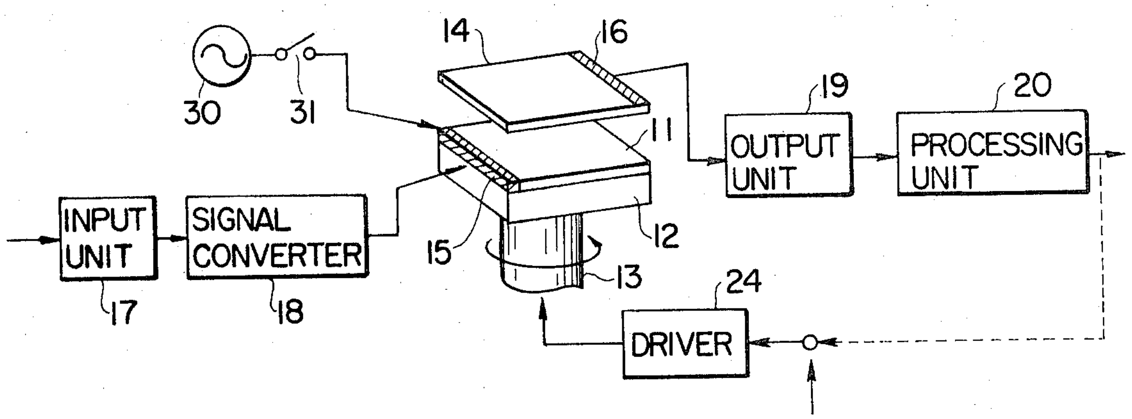
FIG. 13 is a schematic diagram showing still another embodiment of the invention.

FIG. 13 schematically illustrates another embodiment of the invention wherein the write and read shift register arrays are constituted of magnetic domain elements as in FIG. 3. In FIG. 13, the same components as in FIG. 11 are indicated by identical reference numerals, for which description is omitted. The numeral 30 denotes a signal source whose amplitude changes with time. The output of this signal source produces a variable bias magnetic field to the domain device 11 in the direction perpendicular to the surface of the device 11. The numeral 31 indicates a switch controlling the signal source 30. In addition to said variable bias magnetic field, a constant bias magnetic field is applied to the domain device 11 also in the direction perpendicular to the surface of the device 11. When a magnetic field is effected on the device 11 from the signal source 30 through the switch 31, this means that a magnetic field which swings vertically in alignement with the constant magnetic field is applied to the domain device 11.

Figure 14:
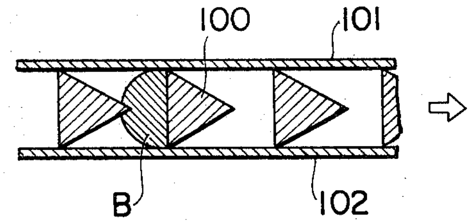
FIGS. 14 and 15 are schematic diagrams illustrating shift registers used in connection with the embodiments as in FIGS. 11 and 12.

The embodiment in FIG. 13 differs from that in FIG. 11 in the domain pattern shift mechanism formed on the magnetic domain device 11. FIG. 14 is a diagram showing the principle of the magnetic domain shift system used in the embodiment as in FIG. 13. In FIG. 14, the drawing face corresponds to the magnetic domain element, which is equipped with a triangle 100 and rails 101 and 102 which are made of permalloy or the like. The symbol B denotes a magnetic domain. As is well known, this magnetic domain shift system is such that the diameter of the domain is modulated by changing the bias magnetic field perpendicular to the surface of the magnetic domain element, and the domain B shifts in sequence at each field change, along the rail 101 to the base of the triangle in the arrow-marked direction.

Figure 15:
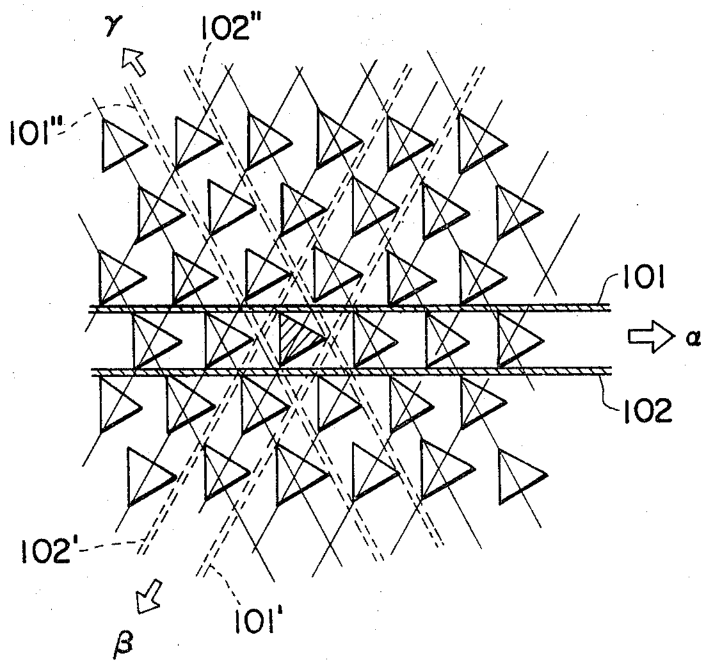

This domain shift principle is utilized in the following manner. Referring to FIG. 13, a triangular magnetic film 100, as seen in FIG. 14, is bonded to the top surface of the magnetic domain device 11 as shown in FIG. 15, and the rail-shaped magnetic films 101 and 102 of FIG. 14 are bonded to the bottom surface of the insulator 14. When the domain device 11 is disposed very closely adjacent to the insulator 14, the domain shifts in sequence from one triangle to another on the domain device 11 along the rails 101 and 102 on the insulator 14. The domain shift direction changes with change in the positional relationship between the triangle 100 of the domain device 11 and rails 101 and 102 of the insulator 14. For example, in FIG. 15, when the rails are in the positions of 101 and 102 relative to the group of triangles on the domain device, the domain B on the triangle with oblique lines shifts in the direction $\alpha$. While, when the rails are in the positions of 101' and 102', the domain B shifts in the direction $\beta$. When they are in the positions of 101'' and 102'', the domain B shifts in the direction $\gamma$.

The operation of the system as in FIG. 13 will briefly be described below. Similar to the operation of the system in FIG. 11, the original input pattern is written on the domain device 11 in parallel bit form from the replicator 15 via the input unit 17 and signal converter 18. In this state, the switch 31 is closed, and an oscillating magnetic field is applied to the domain device 11 from the signal source 30. Then the switch 31 is turned off, the insulator 14 is disassociated from the top surface of the domain device 11, and the domain device is rotated to a preset angle by the driver 24. By this operation, the positional relationship between the triangle on the domain device 11 and the rails on the insulator 14 is changed. After the angle setting operation, the insulator 14 is lowered to the top surface of the domain device 11, the switch 31 is turned on, the domain pattern on the domain device 11 is shifted in a specified direction and then is read out from the detector 16. Other processing operations are the same as in the system of FIG. 11.

As has been described above, the two-dimensional pattern normalizer of this invention has a number of distinctive advantages as essentially summarized below.

1. An output pattern rotated to a desired angle with respect to the input pattern can be obtained by using the system of FIG. 11.

2. The picture element can be securely transferred from the write system to the read system in the arrangement having the write pattern shift direction differentiated from the read pattern shift direction.

3. Because the pattern is rotated by mechanical means, the rotation is secure and easy.

While there have been shown and described but specific embodiments of the invention, it will be understood by those skilled in the art that the invention is not limited thereto or thereby.

What is claimed is:

1. A two-dimensional pattern normalizer comprising:

two-dimensional memory means for storing a two-dimensional pattern in the form of a parallel bit train;

a first array of shift registers disposed in parallel on said memory means;

means for supplying said first array of shift registers with a parallel bit train signal corresponding to said two-dimensional pattern;

a second array of shift registers electrically isolated from said first array of shift registers and disposed at a desired angle with respect to said first array of shift registers;

control means for transferring the bit train signal being shifted along said first array of shift registers to the second array of shift registers in the region in which said first and second arrays of shift registers cross each other; and means for detecting in parallel the bit train signal which shifts along said second array of shift registers.

2. A two-dimensional pattern normalizer as defined in claim 1, in which said first and second arrays of shift registers are formed on one substrate and separated by an insulating layer.

3. A two-dimensional pattern normalizer as defined in claim 1, in which said first array of shift registers is formed on one plane of said memory means, and said second array of shift registers is formed on an electrically insulating plate disposed opposite to said memory means.

4. A two-dimensional pattern normalizer as defined in claim 3, in which one of said memory means and said insulating plate is supported to be rotatable with respect to each other.

5. A two-dimensional pattern normalizer as defined in claim 3, in which said first and second arrays of shift registers comprise a number of triangular magnetic films formed on said memory means, a plurality of rail-shaped magnetic films formed on said insulating plate, and means for applying an alternating magnetic field to said memory medium perpendicular to the surface of said memory means.

6. A two-dimensional pattern normalizer as defined in claim 1, in which said memory means comprises a magnetic material having a magnetic anisotropy which stores information depending upon whether the single wall domain having a magnetization reversed from the surrounding regions is present or absent.

7. A two-dimensional pattern normalizer as defined in claim 1, in which the shift registers comprise a number of conductor loops formed in the shift direction, and means for supplying said conductor loops with a current having different phases.

8. A two-dimensional pattern normalizer as defined in claim 7, in which the conductor loops constituting the individual shift register arrays are at least partly superposed on each other by way of an insulating layer in the region where said first and second arrays of shift registers cross each other.

9. A two-dimensional pattern normalizer as defined in claim 1, in which each of said shift register arrays comprises a number of bistable circuits connected in cascade, and gates connected among the bistable circuits, and means for controlling said gates so that the signal is transferred from one register to another in the region where said first and second shift register arrays cross each other.

10. A two-dimensional pattern normalizer as defined in claim 1, in which a plurality of said second arrays of shift registers are provided, these shift register arrays being electrically isolated from each other and disposed at different angles with respect to each other.

11. A two-dimensional pattern normalizer as defined in claim 1, in which a plurality of said second arrays of shift registers are provided, these arrays crossing said first array of shift registers at an arbitrary angle and being curved on said memory medium so as to again cross said first array of shift registers.

12. A two-dimensional pattern normalizer as defined in claim 6, in which said first and second arrays of shift registers are formed on one substrate and separated by an insulating layer.

13. A two-dimensional pattern normalizer as defined in claim 12, in which the shift registers comprise a number of conductor loops formed in the shift direction, and means for supplying said conductor loops with a current having different phases.

14. A two-dimensional pattern normalizer as defined in claim 12, in which said first array of shift registers is formed on one plane of said memory means, and said second array of shift registers is formed on an electrically insulating plate disposed opposite to said memory means.

15. A two-dimensional pattern normalizer as defined in claim 14, in which said first and second arrays of shift registers comprise a number of triangular magnetic films formed on said memory means, a plurality of rail-shaped magnetic films formed on said insulating plate, and means for applying an alternating magnetic field to said memory medium perpendicular to the surface of said memory means.

16. A two-dimensional pattern normalizer comprising a plurality of pattern normalizers each being constructed as in claim 1, wherein the signal applied to the first array of shift registers and the output signal from the second array of shift registers are selectively switched, and said plurality of normalizers are connected to each other by way of a switching device which provides only a selected one of the signals.

* * * * *